(12) United States Patent
Kohyama (10) Patent No.: US 7,688,886 B2
(45) Date of Patent: Mar. 30, 2010

(54) RECEIVING METHOD AND RECEIVING APPARATUS

(75) Inventor: Tadahisa Kohyama, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 471 days.

(21) Appl. No.: 10/590,488

(22) PCT Filed: Feb. 10, 2005

(86) PCT No.: PCT/JP2005/002065

§ 371 (c)(1),
(2), (4) Date: Jun. 18, 2007

(87) PCT Pub. No.: WO2005/081422

PCT Pub. Date: Sep. 1, 2005

(65) Prior Publication Data

US 2008/0037622 A1    Feb. 14, 2008

(30) Foreign Application Priority Data

Feb. 24, 2004    (JP) .............................. 2004-047900

(51) Int. Cl.
*H03H 7/30* (2006.01)
(52) U.S. Cl. .................................. 375/232
(58) Field of Classification Search ................. 375/232, 375/316, 148, 150, 230
See application file for complete search history.

(56) References Cited

U.S. PATENT DOCUMENTS 4,985,902 A * 1/1991 Gurcan ....................... 375/233

(Continued)

FOREIGN PATENT DOCUMENTS

JP    4-177947 A    6/1992

(Continued)

OTHER PUBLICATIONS

International Preliminary Report of Patentability and Written Opinion issued in corresponding International Patent Application No. PCT/JP2005/002065, mailed Sep. 28, 2006.

(Continued)

*Primary Examiner*—David C Payne
*Assistant Examiner*—Leon-Viet Q Nguyen
(74) *Attorney, Agent, or Firm*—McDermott Will & Emery LLP (57) ABSTRACT

The power consumption of a receiving apparatus is reduced. A first equalization unit receives the input of digital signals and then performs equalization processing on them so as to output first equalizer output signals. A first selector selects either the digital signals or the first equalizer output signals, and outputs the selected signals to an despread unit or a second equalization unit. The despread unit carries out an despread, and an PSK demodulation unit demodulates the despread signal by PSK. The second equalization unit performs equalization processing, and a CCK demodulation unit performs CCK demodulation. A second selector operates in response to the second selector. A modulation scheme determining unit extracts information on a modulation scheme in use, from the signal demodulated by the PSK demodulation unit so as to decide on the modulation scheme. Based on the modulation scheme determined, a decision unit specifies the selection of signals at the first selector and the second selector.

5 Claims, 11 Drawing Sheets

U.S. PATENT DOCUMENTS

| | | | |
|---|---|---|---|
| 5,450,442 A * | 9/1995 | Umemoto et al. | 375/230 |
| 5,787,118 A * | 7/1998 | Ueda | 375/232 |
| 7,187,730 B1 * | 3/2007 | Hu et al. | 375/343 |
| 7,263,119 B1 * | 8/2007 | Hsu et al. | 375/150 |

FOREIGN PATENT DOCUMENTS

| | | |
|---|---|---|
| JP | 7-231285 A | 8/1995 |
| JP | 8-307428 A | 11/1996 |
| JP | 11-163770 A | 6/1999 |
| JP | 11-509063 A | 8/1999 |
| JP | 2001-218129 A | 8/2001 |
| JP | 2005-72819 A | 3/2005 |
| WO | WO 97/03509 | 1/1997 |

OTHER PUBLICATIONS

International Search Report issued in corresponding International Application No. PCT/JP2005/002065.

Kenji Yokoyama et al., "A Study on Complementary Code Keying Demodulation in 802.11b Wireless LAN," IEICE General Conference, Mar. 2003, p. 669, Institute of Electronics, Information and Communication Engineers.

Japanese Notification of Reason(s) for Refusal, w/ English translation thereof, issued in Japanese Patent Application No. JP 2004-047900 dated May 26, 2009.

* cited by examiner

RECEIVING METHOD AND RECEIVING APPARATUS

RELATED APPLICATIONS

This application is the U.S. National Phase under 35 U.S.C. §371 of International Application No. PCT/JP2005/002065, filed on Feb. 10, 2005, which in turn claims the benefit of Japanese Application No. 2004-047900, filed on Feb. 24, 2004, the disclosures of which Applications are incorporated by reference herein.

TECHNICAL FIELD

The present invention relates to the receiving technologies, and it particularly relates to a receiving method and a receiving apparatus for reducing the power consumption.

BACKGROUND TECHNOLOGY

In the mobile-phone system or wireless LAN (Local Area Network) comprised of base station apparatuses and terminal apparatuses, the terminal apparatus is generally powered by batteries. For the convenience when a terminal apparatus is used, the battery life of the terminal apparatus is desired to be longer. Accordingly, the lower power consumption is required for the processing executed by the terminal apparatus. In general, the terminal apparatus in the wireless communication system is not constantly transmitting and receiving the signals but is usually in an operational mode, namely, a receiving standby mode, in which the signal transmitted at predetermined time intervals from the base station apparatus are received when there is no data to be transmitted or received. In the receiving standby mode, it is not required that all of the receiving functions provided in the terminal apparatus is in operation. Accordingly, in the receiving standby mode, only part of receiving functions is working in the terminal apparatus to lower the power consumption (See Patent Reference (1) in the Patent Reference, for instance).

[Patent Reference]

(1) Japanese Patent Application Laid-Open No. Hei08-307428.

However, in order to further reduce the power consumption, the power consumed in transmitting or receiving the signals under other than the receiving standby mode must be reduced. For example, the wireless LAN complied with the IEEE 802.11b standard is compatible with a plurality of modulation schemes, namely, the modulation schemes whose transmission speed is high as well as those whose transmission speed is low. In general, the modulation scheme compatible with higher transmission rates is likely to be affected by the distortion in the propagation path and therefore the transmission quality of signals is likely to deteriorate. One of techniques to reduce the effect of distortion in such propagation path is the adaptive equalizer. However, the power consumption can be no longer reduced once the adaptive equalizer is in operation. On the other hand, although the adaptive equalizer is not in operation, the transmission quality of signals is unlikely to deteriorate in the modulation scheme compatible with lower transmission rates.

DISCLOSURE OF THE INVENTION

The present invention has been made in view of such circumstances and an objective thereof is to provide a receiving method and a receiving apparatus for reducing the power consumption by changing a circuit to be operated in accordance with a modulation scheme used for the transmission of signals.

One embodiment of the present invention relates to a receiving apparatus. This apparatus comprises: a receiver which receives a signal; an equalization processing unit which performs equalization processing on the signal received by the receiver; a selector which selects either the signal received by the receiver or the signal on which the equalization processing has been performed by the equalization processing unit; a first demodulation unit which demodulates the selected signal according to a first modulation scheme when a modulation scheme of the selected signal is the first modulation scheme; and a second demodulation unit which demodulates the selected signal according to a second modulation scheme when a modulation scheme of the selected signal is the second modulation scheme whose transmission rate is higher than that of the first modulation scheme. In this apparatus, if the modulation scheme of the received signal is the first modulation scheme, the selector may select the signal received by the receiver.

With the above apparatus, the signal that has undergone the equalization processing is not selected but the received signal is selected and then demodulated in the case of the first modulation method whose transmission speed is low and the need for the equalization processing is eliminated, so that the power consumption can be reduced.

When the selector selects the signal received by the receiver, the equalization processing unit may stop the equalization processing. A signal to be received by the receiver may be a burst signal and the modulation scheme for a header portion of the burst signal may be the first modulation scheme, and the equalization processing unit may perform equalization processing on at least part of the header portion of the burst signal, and may stop performing the equalization processing on the remaining portion of the burst signal when the selector has selected the signal received by the receiver. The receiving apparatus may further comprise a measurement unit which measures the quality of the signal received by the receiver when the modulation scheme of the signal received by the receiver is the first modulation signal; and when the measured quality of the signal is worse than a predetermined threshold value, the selector may select the signal on which the equalization processing has been performed by the equalization processing unit although the modulation scheme of the received signal is the first modulation scheme. The equalization processing unit may include a plurality of storages which are arranged in series; and when the signal received by the receiver is selected, the selector may output a value stored in any of the plurality of storages included in the equalization processing unit. The second demodulation unit may further include a residual component processing unit which further performs equalization processing on the selected signal.

Another embodiment of the present invention relates to a receiving method. This method comprises: performing equalization processing on a received signal; selecting either a received signal or a signal that has undergone the equalization processing; demodulating the selected signal according to a first modulation scheme when a modulation scheme of the selected signal is the first modulation scheme; and demodulating the selected signal according to a second modulation scheme when a modulation scheme of the selected signal is the second modulation scheme whose transmission rate is higher than that of the first modulation scheme. In this method, when the modulation scheme of the received signal is the first modulation scheme, the selecting may select the received signal.

It is to be noted that any arbitrary combination of the above-described structural components and the expressions of the present invention changed among a method, an apparatus, a system, a recording medium, a computer program and so forth are also effective as the present embodiments.

THE BEST MODE FOR CARRYING OUT THE INVENTION

First Embodiment

An outline of the present invention will be given before a detailed description thereof. A first embodiment according to the present invention relates to a receiving apparatus of wireless LAN system that conforms to the IEEE 802.11b standard. A receiving apparatus according to the present embodiments, which is compatible with the combination of DBPSK or DQPSK and Barker code (hereinafter referred to as "PSK modulation") and also compatible with the CCK modulation, demodulates received signals. The receiving apparatus includes a linear filter, provided before a demodulation unit compatible with the PSK modulation and a modulation unit compatible with the CCK modulation, which performs equalization processing on the received signal. If the modulation scheme for the received signal is the CCK modulation, then the receiving apparatus according to the present embodiment will get a linear filter to operate, and carry out the demodulation after the received signal has been subjected to the equalization processing. If, on the other hand, the modulation scheme for the received signal is the PSK modulation, then the receiving apparatus will carry out the demodulation without activating the linear filter. That is, the receiving apparatus aims to reduce the power consumption by not activating the linear filter in the case of the PSK modulation.

An outline of CCK modulation in the IEEE 802.11b standard is described here since this scheme is assumed, for example, in the present embodiments. In the CCK modulation, 8 bits constitute one unit (hereinafter this unit will be referred to as "CCK modulation unit") and these 8 bits are called d1, d2, . . . , d8 counted from the highest order. The lower-order 6 bits are respectively mapped to constellations of QPSK (Quadrature Phase Shift Keying) in units of [d3, d4], [d5, d6] and [d7, d8] among the CCK modulation units. The thus mapped phases will be indicated respectively by ($\phi 2$, $\phi 3$, $\phi 4$). Eight kinds of spread codes P1 to P8 are generated from the phases $\phi 2$, $\phi 3$ and $\phi 4$, as follows:

$$P1=\phi 2+\phi 3+\phi 4$$

$$P2=\phi 3+\phi 4$$

$$P3=\phi 2+\phi 4$$

$$P4=\phi 4$$

$$P5=\phi 2+\phi 3$$

$$P6=\phi 3$$

$$P7=\phi 2$$

$$P8=0 \quad (1)$$

On the other hand, the higher-order 2 bits [d1, d2] among the CCK modulation units are mapped to a constellation of DQPSK (Differential encoding Quadrature Phase Shift Keying), and it is assumed here that the thus mapped phase is $\phi 1$. It is to be noted that $\phi 1$ corresponds to a signal to be spread. From the signal to be spread $\phi 1$ and the spread codes P1 to P8, the following 8 ways of chip signals, namely, X0 to X7 are generated.

$$X0=e^{j(\phi 1+P1)}$$

$$X1=e^{j(\phi 1+P2)}$$

$$X2=e^{j(\phi 1+P3)}$$

$$X3=-e^{j(\phi 1+P4)}$$

$$X4=e^{j(\phi 1+P5)}$$

$$X5=e^{j(\phi 1+P6)}$$

$$X6=-e^{j(\phi 1+P7)}$$

$$X7=e^{j(\phi 1+P8)} \quad (2)$$

A transmitting apparatus transmits the chip signals in the order of X0 to X7 (hereinafter the unit of time sequence constituted by chip signals X0 to X7 will be referred to "CCK modulation unit", too).

It is to be noted that in the IEEE 802.11b standard the phase-modulated signals of DBPSK or DQPSK, in addition to the CCK modulation, are spread by known spread codes and then transmitted. Hereinbelow, the received signals in the present embodiments are, in principle, in the mode of chip signals.

Figure 1:
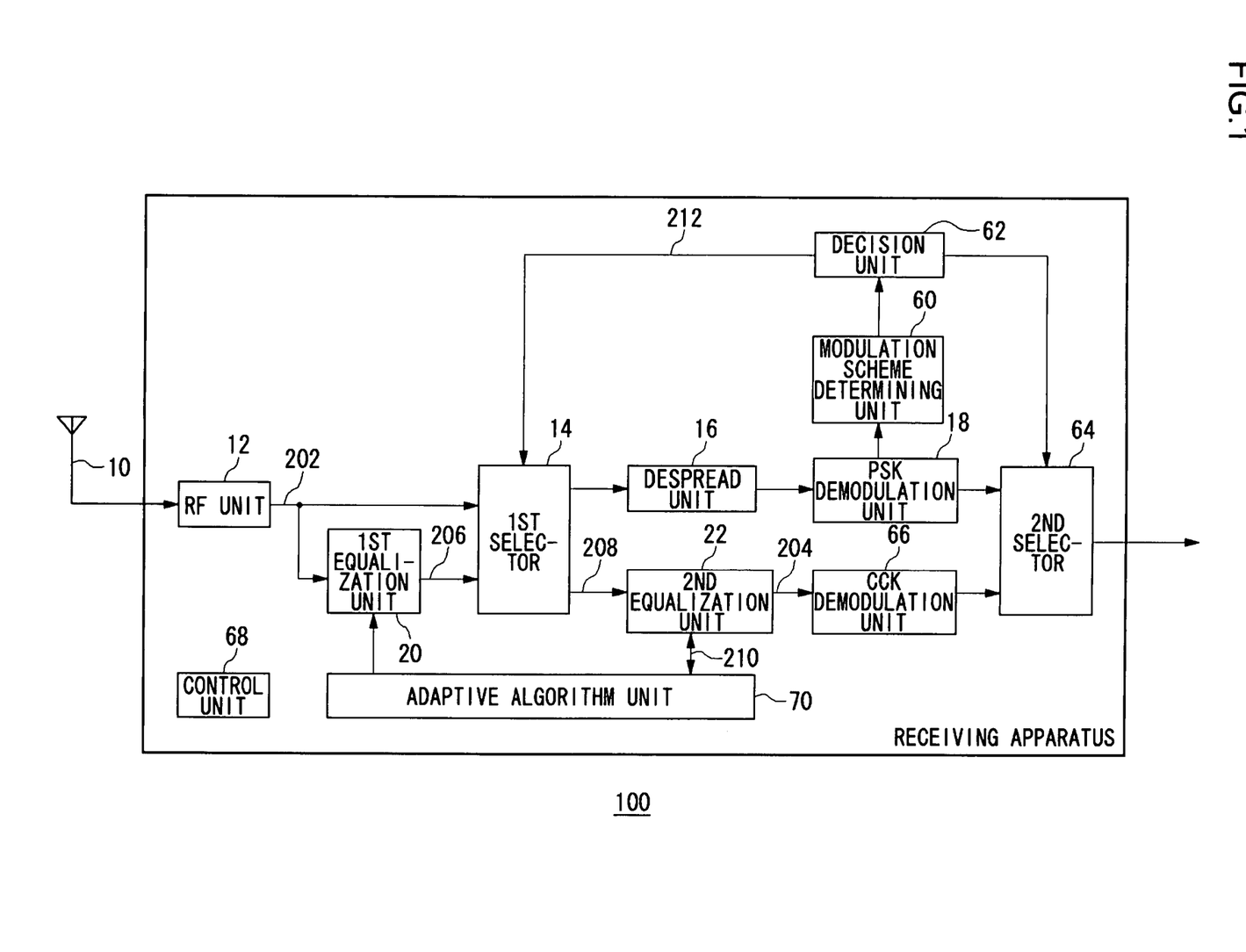
FIG. 1 is a diagram showing a structure of a receiving apparatus according to a first embodiment.

FIG. 1 shows a structure of a receiving apparatus 100 according to the first embodiment. The receiving apparatus 100 includes an antenna 10, an RF unit 12, a first selector 14, an despread unit 16, a PSK demodulation unit 18, a first equalization unit 20, a second equalization unit 22, a CCK demodulation unit 66, a second selector 64, a modulation scheme determining unit 60, a decision unit 62, a control unit 68 and an adaptive algorithm unit 70. Signals involved include a digital signal 202, a first equalizer output signal 206, a second equalizer input signal 208, a second equalizer output signal 204 and a tap-coefficient-related signal 210.

The antenna 10 receives radio-frequency burst signals transmitted from a transmitting apparatus (not shown).

The RF unit 12 frequency-converts the received RF burst signals into intermediate-frequency (IF) burst signals. The RF unit 12 performs quadrature detection on the IF burst signals and then performs A-D conversion thereon so as to output baseband burst signals as digital signals 202. Though the digital signal 202, which is the baseband burst signal, is generally represented by two components which are an in-phase component and a quadrature component, it is drawn and depicted herein as a single integrated entity.

The first equalization unit 20 inputs a digital signal 202 and subjects it to equalization processing so as to output a first equalizer output signal 206. Though a structure of the first equalization unit 20 will be described later, it includes a plurality of taps and a plurality of tap coefficients corresponding thereto are estimated by an LMS (Least Mean Squares) algorithm and the like.

The first selector 14 selects either the digital signal 202 inputted from the RF unit 12 or the first equalizer output signal 206 inputted from the first equalization unit 20, and outputs the selected signal to the despread unit 16 or the second equalization unit 22. That is, if upon receipt of the input of a selection signal 212 it is notified through this selection signal 212 that the modulation scheme of the burst signal is the PSK modulation, the first selector 14 outputs the digital signal 202 inputted from the RF unit 12 to the despread unit 16. And if it is notified through this selection signal 212 that the modulation scheme of the burst signal is the CCK modulation, the first selector 14 outputs the first equalizer output signal 206 inputted from the first equalization unit 20 to the second equalization unit 22. Here, the signal outputted from the second equalization unit 22 is a second equalizer input signal 208.

The despread unit 16 despreads the signal inputted from the first selector 14 by a Barker code. The PSK demodulation unit 18 demodulates the despread signal by DBPSK or DQPSK.

The second equalization unit 22 inputs the second equalizer input signal 208 and further performs equalization processing so as to output the second equalizer output signal 204. Here, the second equalization unit 22 is used to remove residual distortion components from the second equalizer input signal 208 which has undergone the equalization processing in the first equalization unit 20. Accordingly, the structure differs from that of the first equalization unit 20, and is structured by a decision feedback equalizer; moreover, the region of an equalizable delayed wave differs from the first equalization unit 20.

The CCK demodulation unit 66 performs CCK demodulation based on Walsh transform, on the second equalizer output signal 204. The second selector 64 selects a signal outputted from either the PSK demodulation unit 18 or the CCK demodulation unit 66. That is, based on the signal inputted from the decision unit 62, the second selector 64 outputs the signal inputted from the PSK demodulation unit 18 if the modulation scheme of the burst signal is the PSK modulation, whereas it outputs the signal inputted from the first equalization unit 20 if the modulation scheme of the burst signal is the CCK modulation.

The modulation scheme determining unit 60 extracts information on a modulation scheme, from the signal demodulated by the PSK demodulation unit 18 and then decides on the modulation scheme. That is, whether it is the CCK modulation or PSK modulation is determined.

Based on the modulation scheme determined, the decision unit 62 specifies the selection of signals at the first selector 14 and the second selector 64. The operation of the first selector 14 and the second selector 64 based on the instruction given by the decision unit 62 is the same as that described above. In particular, a signal outputted to the first selector 14 will be called a selection signal 212.

The adaptive algorithm unit 70 computes tap coefficients used to carry out equalization processing in the first equalization unit 20 and the second equalization unit 22, based on an adaptive algorithm. The adaptive algorithm to be used here may be arbitrary such as LMS algorithm or RLS algorithm. It is to be noted that signals between the adaptive algorithm unit 70 and the second equalization unit 22 is called a tap-coefficient-related signal 210.

The control unit 68 controls the timing and the like of the receiving apparatus 100.

In terms of hardware, this structure can be realized by a CPU, a memory and other LSIs of an arbitrary computer. In terms of software, it can be realized by memory-loaded programs which have managing and scheduling functions or the like, but drawn herein are function blocks that are realized in cooperation with those. Thus, it is understood by those skilled in the art that these function blocks can be realized in a variety of forms such as by hardware only, software only or the combination thereof.

Figure 2:
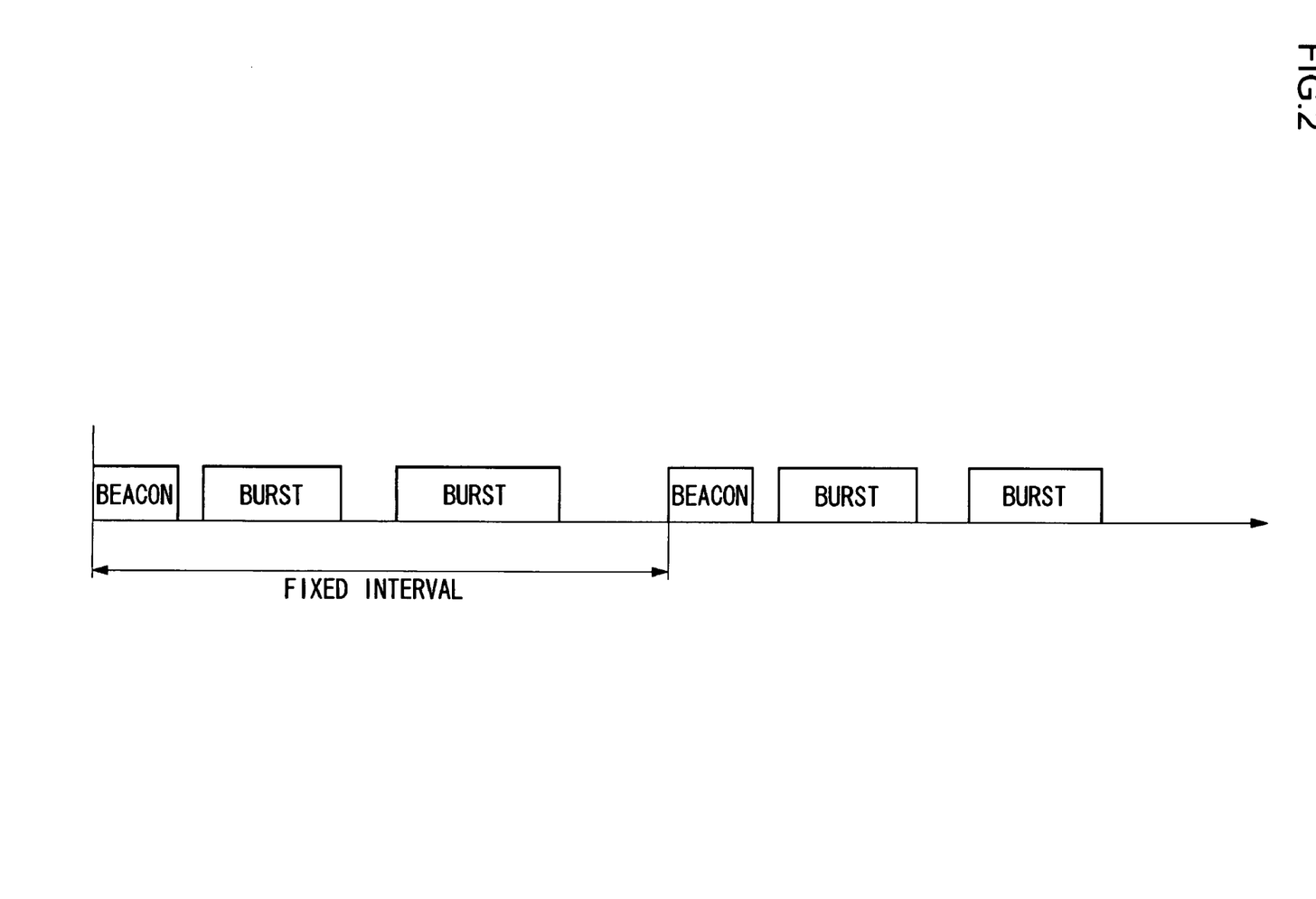
FIG. 2 is a diagram showing signals transferred between a terminal apparatus and a base station apparatus according to a first embodiment.

FIG. 2 shows signals transferred between a terminal apparatus and a base station apparatus according to the first embodiment. The receiving apparatus 100 shown in FIG. 1 corresponds to a receiving function of the terminal apparatus. Beacons shown in FIG. 2 are signals transmitted in a downlink from the base station apparatus to the terminal apparatus at fixed time intervals. Burst signals are indicated without distinguishing between uplink and downlink. As shown in FIG. 2, the terminal apparatus operates to receive beacons even when it is in the receive standby mode. The time interval at which the beacon is transmitted is contained in information transmitted through the beacon, and the receiving apparatus 100 demodulates the beacon so as to acquire the time interval at which the beacon is transmitted.

Figure 3:
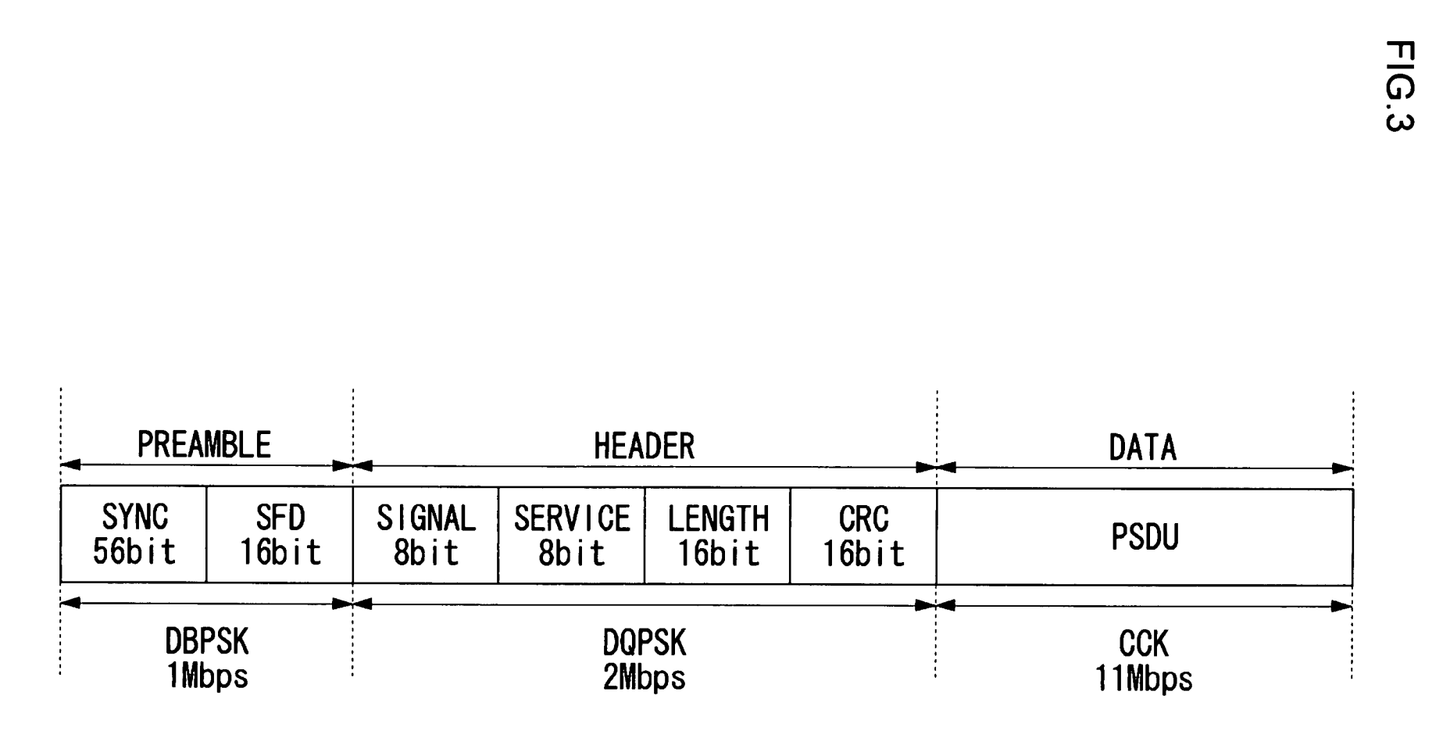
FIG. 3 is a diagram showing a burst format according to a first embodiment.

FIG. 3 shows a burst format according to the first embodiment. This burst format corresponds to ShortPLCP of IEEE 802.11b standard. As shown in FIG. 3, the burst signal includes a preamble area, a header area and a data area. The preamble is communicated by a modulation scheme of DBPSK at a transmission rate of 1 Mbps, the header is communicated by a modulation scheme of DQPSK at a transmission rate of 2 Mbps, and the data is communicated by a modulation scheme of CCK at a transmission rate of 11 Mbps. The preamble includes 56-bit SYNC and 16-bit SFD, and the header includes 8-bit SIGNAL, 8-bit SERVICE, 16-bit LENGTH and 16-bit CRC. On the other hand, the length of PSDU that corresponds to the data is variable. It is to be noted that the preamble corresponds to a known signal with which to estimate a delay profile.

Figure 4:
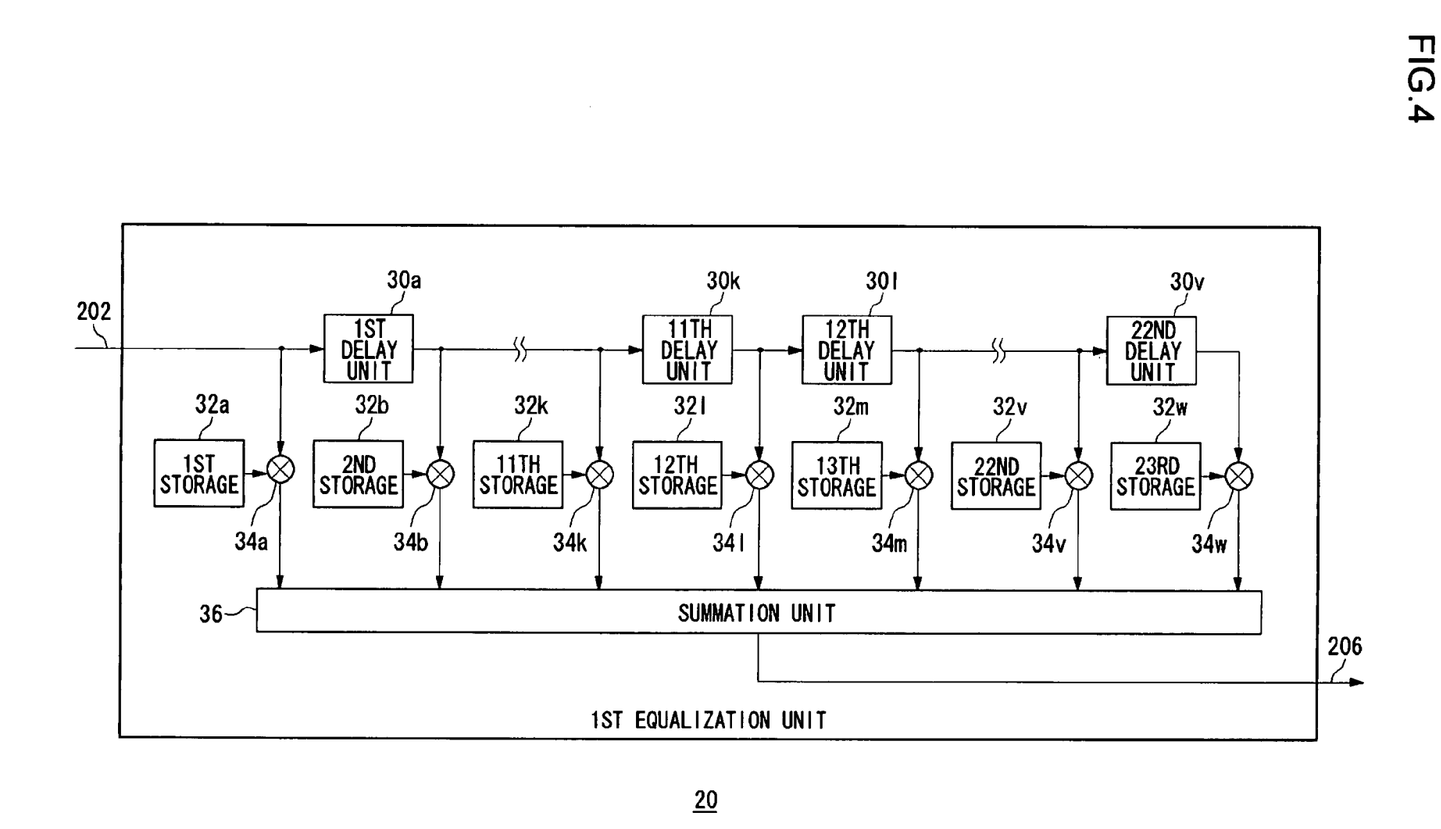
FIG. 4 is a diagram showing a structure of the first equalization unit shown in FIG. 1.

FIG. 4 shows a structure of the first equalization unit 20. The first equalization unit 20 includes a 1st delay unit 30*a*, . . . a 11th delay unit 30*k*, a 12th unit 30*l*, . . . and a 22nd delay unit 30*v*, which are generically referred to as "delay unit 30", a 1st storage 32*a*, a 2nd storage 32*b*, . . . an 11th storage 32*k*, a 12th storage 32*l*, a 13th storage 32*m*, . . . a 22nd storage 32*v* and a 23rd storage 32*w*, which are generically referred to as "storage 32", a 1st multiplier 34*a*, a 2nd multiplier 34*b*, . . . an 11th multiplier 34*k*, a 12th multiplier 34*l*, a 13th multiplier 34*m*, . . . a 22nd multiplier 34*v* and a 23rd multiplier 34*w*, which are generically referred to as "multiplier 34", and a summation unit 36.

The delay unit 30 delays a digital signal 202. The stage between two delay units 30 corresponds to the above-mentioned tap. Since twenty-two delay units 30 are provided as shown in FIG. 4, the number of taps is equivalent to 23. The delay amount in the delay unit 30 is set to ½ of the time interval of a chip signal.

The storages 32 store, via signal lines (not shown), tap coefficients computed by the adaptive algorithm unit 70 in the header portions of the burst signals, respectively. Once the tap coefficients are set in the storages 32, they are fixed during the burst signal period.

The multipliers 34 multiply the signals outputted from the delay units 30 by the tap coefficients stored in the storages 32. The summation unit 36 sums up the multiplication results at the multipliers 34 so as to output the first equalizer output signals 206.

Figure 5:
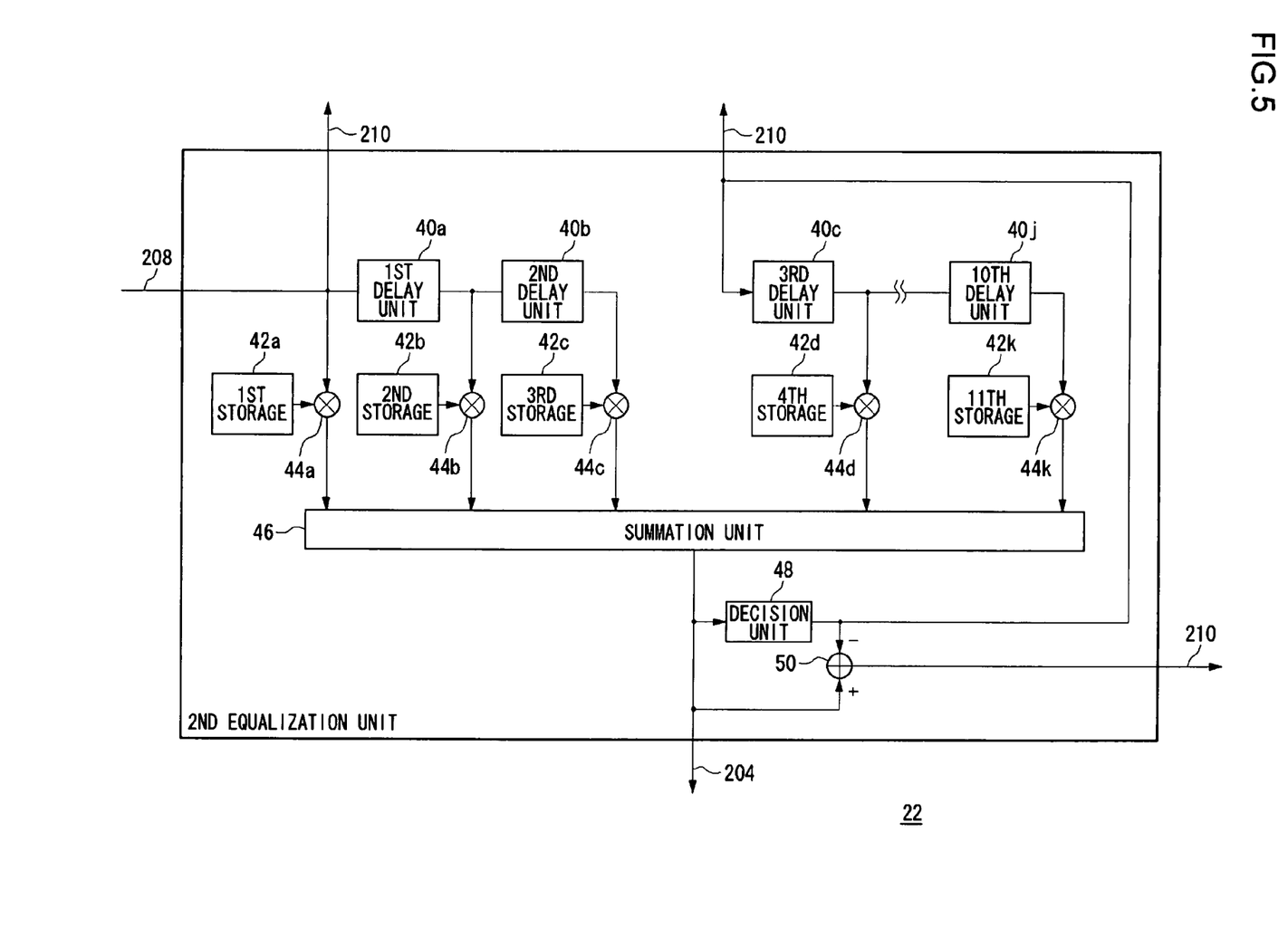
FIG. 5 is a diagram showing a structure of the second equalization unit shown in FIG. 1.

FIG. 5 shows a structure of the second equalization unit 22. The second equalization unit 22 includes a 1st delay unit 40a, a 2nd delay unit 40b, a 3rd delay unit 40c, ... and a 10th delay unit 40j, which are generically referred to as "delay unit 40", a 1st storage 42a, a 2nd storage 42b, a 3rd storage 42c, a 4th storage 42d, ..., and an 11th storage 42k, which are generically referred to as "storage 42", a 1st multiplier 44a, a 2nd multiplier 44b, a 3rd multiplier 44c, a 4th multiplier 44d, ... and an 11th multiplier 44k, which are generically referred to as "multiplier 44", a summation unit 46, a decision unit 48, and an adder 50.

The delay unit 40 is made up of two parts which are a feedforward tap unit (hereinafter referred to as "FF unit"), comprised of the 1st delay unit 40a and the 2nd delay unit 40b, and a feedback tap unit (hereinafter referred to as "FB unit") comprised of the 3rd delay unit 40c to the 10th delay unit 40j. The stage between two delay units 40 corresponds to the above-mentioned tap. Since there are provided two delay units 40 as shown in FIG. 5, the number of taps is three. On the other hand, in the FB unit each delay unit 40 corresponds to the above-mentioned tap. Since there are provided eight delay units 40 as shown in FIG. 5, the number of taps is eight. The delay amount in the delay unit 40 is set to the time interval of a chip signal.

The storages 42 store, via signal lines (not shown), tap coefficients computed by the adaptive algorithm unit 70, respectively. The tap coefficients to be stored in the storages 42 are updated over the burst period.

The multipliers 44 multiply the signals outputted from the delay units 40 by the tap coefficients stored in the storages 42. The summation unit 46 sums up the multiplication results at the multipliers 44. The decision unit 48 determines the signal outputted from the summation unit 46. The determined signal is outputted to the above-described adaptive algorithm unit 70 via the tap-coefficient-related signal 210 and, at the same time, is inputted to the 3rd delay unit 40c.

The adder 50 subtracts the signal determined by the decision unit 48 from the signal outputted from the summation unit 46 so as to obtain error, which in turn is outputted to the above-described adaptive algorithm unit 70 via the tap-coefficient-related signal 210.

Figure 6:
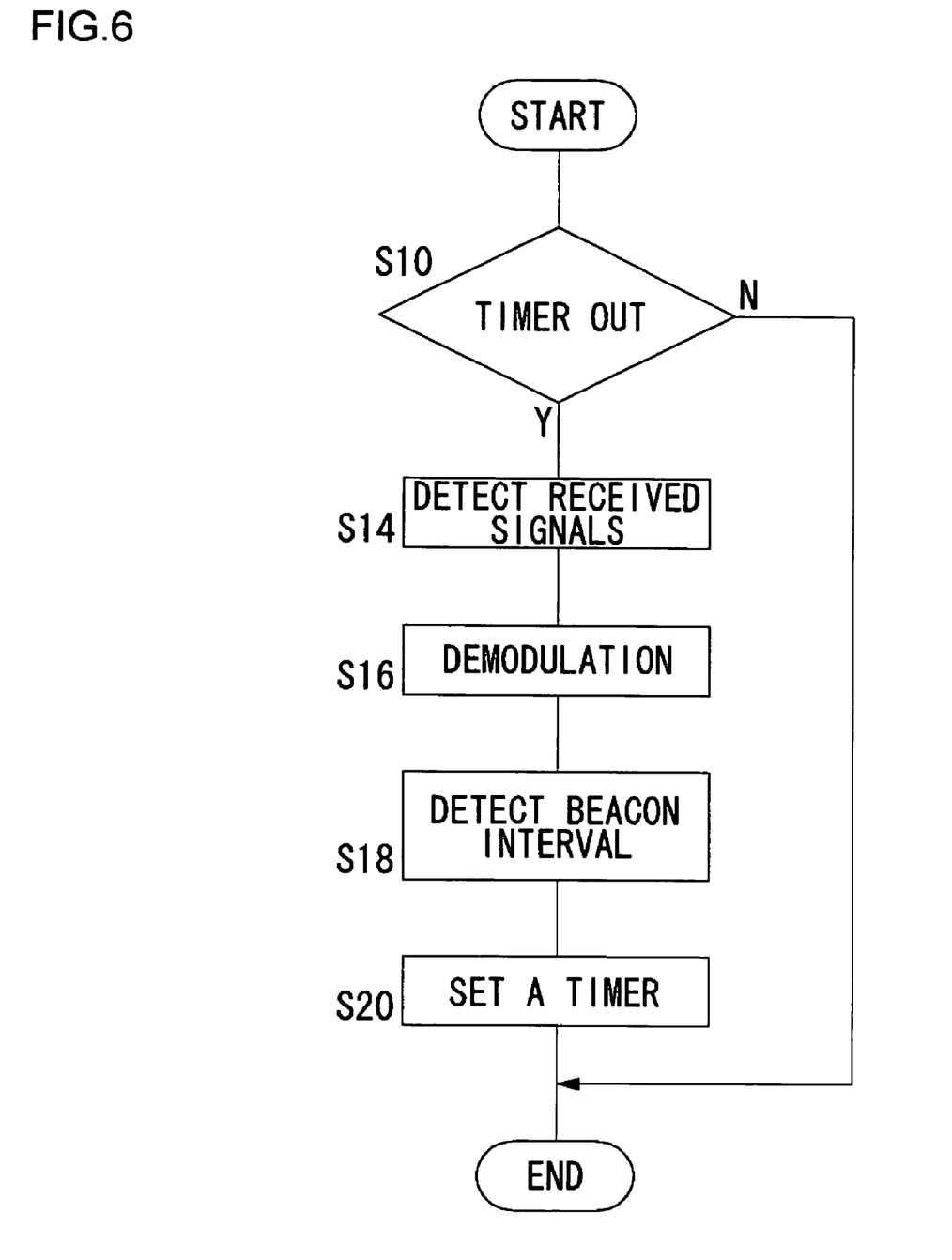
FIG. 6 is a flowchart showing an operation of the receiving apparatus shown in FIG. 1 when it is in a receiving standby state.

FIG. 6 shows an operation of the receiving apparatus 100 when it is in a receiving standby state. As described earlier, under a receiving standby state, the receiving apparatus 100 receives beacons at predetermined time intervals. Since the modulation scheme of the beacon is either DBPSK or DQPSK, the receiving apparatus 100 switches the first selector 14 and the second selector 64 and stops the operation of the first equalization unit 20 so that the processings at the despread unit 16 and the PSK demodulation unit 18 are selected.

When it is timer-out (Y of S10), the receiving apparatus 100 detects received signals (S14). The PSK demodulation unit 18 demodulates the received signals (S16), and the control unit 68 detects a beacon interval from the demodulated signals (S18). Then the control unit 68 sets a timer (S20). On the other hand, the receiving apparatus 100 does not carry out the above-described operation until it is timer-out (N of S10).

Figure 7:
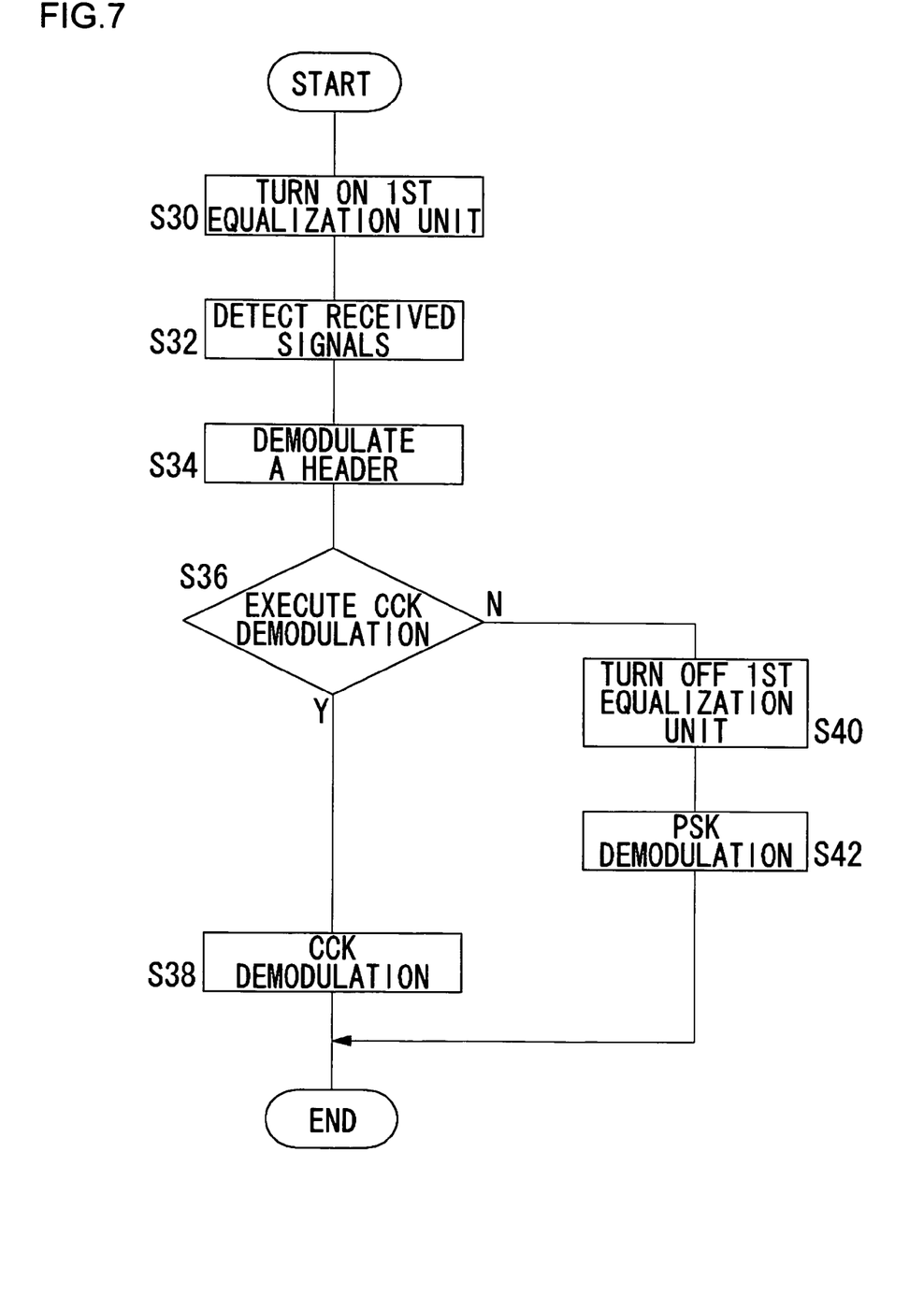
FIG. 7 is a flowchart showing an operation of the receiving apparatus shown in FIG. 1 when data are being received.

FIG. 7 shows an operation of the receiving apparatus 100 when data are being received. The receiving apparatus 100 turns the first equalization unit 20 on (S30). Now the first equalization unit 20 has been turned on. However, since the preamble and the header of a burst signal have been modulated by PSK as shown in FIG. 3, the first selector 14 and the second selector 64 so operate as to select the despread unit 16 and the PSK demodulation unit 18. That is, when the first equalization unit 20 is turned on, the tap coefficients are computed in the adaptive algorithm unit 70. The receiving apparatus 100 detects received signals (S32). The PSK demodulation unit 18 demodulates the header (S34), and the modulation scheme determining unit 60 acquires from the demodulated header a modulation scheme of the data. As a result thereof, if CCK modulation is to be executed (Y of S36), the CCK demodulation unit 66 carries out CCK demodulation. If, on the other hand, CCK demodulation is not to be executed (N of S36), the first equalization unit 20 is turned off (S40). Then the despread unit 16 and the PSK demodulation unit 18 carry out PSK demodulation (S42).

Figure 8:
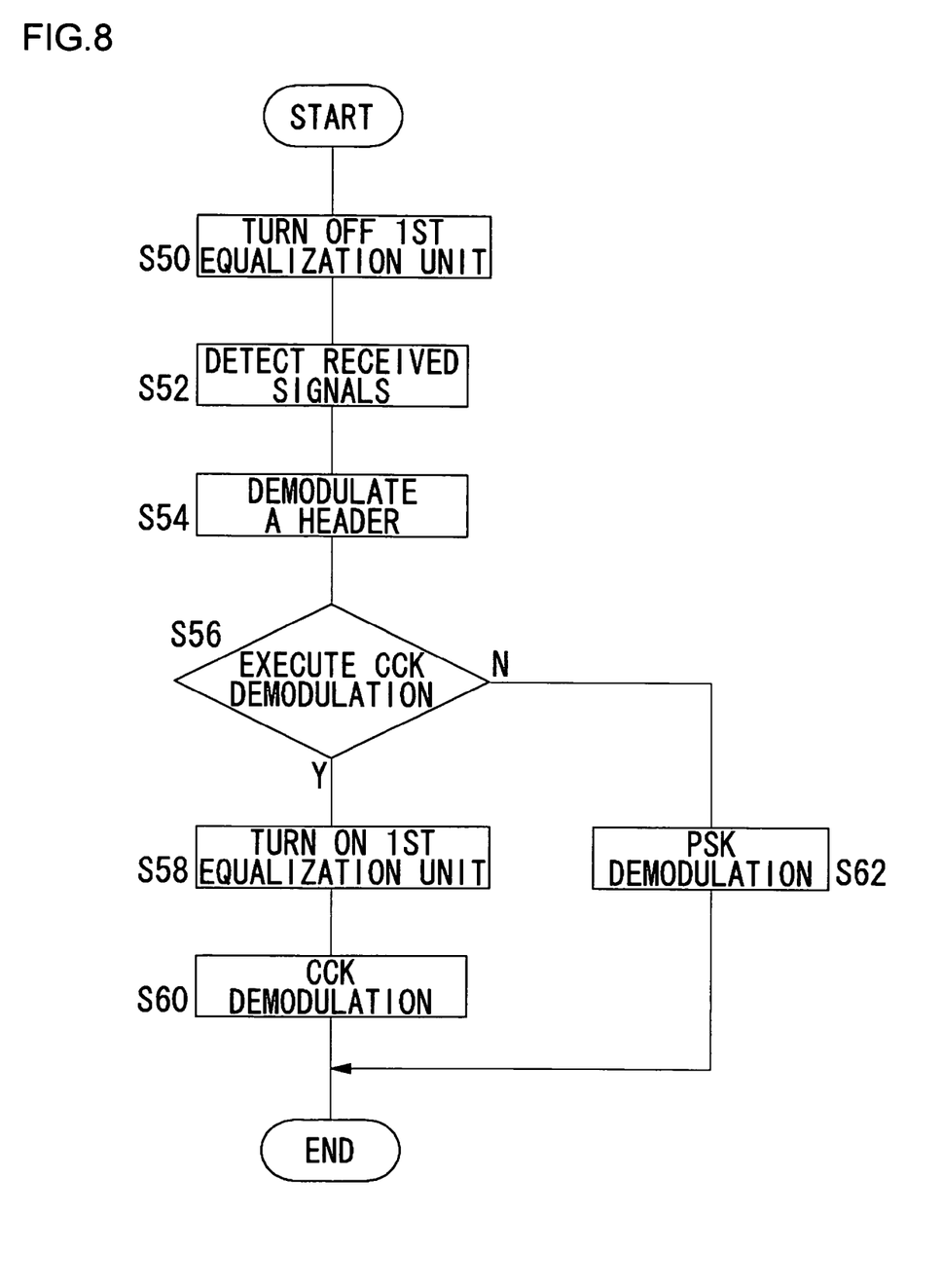
FIG. 8 is a flowchart showing an operation of the receiving apparatus shown in FIG. 1 when data are being received.

FIG. 8 shows an operation of the receiving apparatus 100 when data are being received. In FIG. 7, the first equalization unit 20 is turned on even in the preamble and the header of a burst signal. However, in FIG. 8, the first equalization unit 20 is turned off in the preamble and the header of a burst signal to reduce the power consumption. The receiving apparatus 100 turns off the first equalization unit 20 (S50). The receiving apparatus 100 detects received signals (S52). The PSK demodulation unit 18 demodulates the header (S54), and the modulation scheme determining unit 60 acquires from the demodulated header a modulation scheme of the data. As a result thereof, if CCK modulation is to be executed (Y of S56), the receiving apparatus 100 turns on the first equalization unit 20 (S58) and the CCK demodulation unit 66 carries out CCK demodulation. If, on the other hand, CCK demodulation is not to be executed (N of S56), the despread unit 16 and the PSK demodulation unit 18 carry out PSK demodulation (S62).

According to the first embodiment of the present invention, the operation of an equalizer is controlled in a manner such that, according to the modulation scheme of the signal, it is activated when the modulation scheme has a high transmission rate and it is deactivated when the modulation scheme has a low transmission rate. By employing this structure, the power consumption can be reduced while the signal transmission quality is being kept at a predetermined level.

Second Embodiment

Similar to the above first embodiment, according to a second embodiment of the present invention the equalizer is activated in the case of a modulation scheme of a high transmission rate and it is stopped in the case of a modulation scheme of a low transmission rate. However, according to the second embodiment, the equalizer is activated even in the case of a modulation scheme of a low transmission rate if the received signals are of low quality and suffer deterioration. As a result thereof, the signal quality of the modulation scheme having a low transmission rate can be improved.

Figure 9:
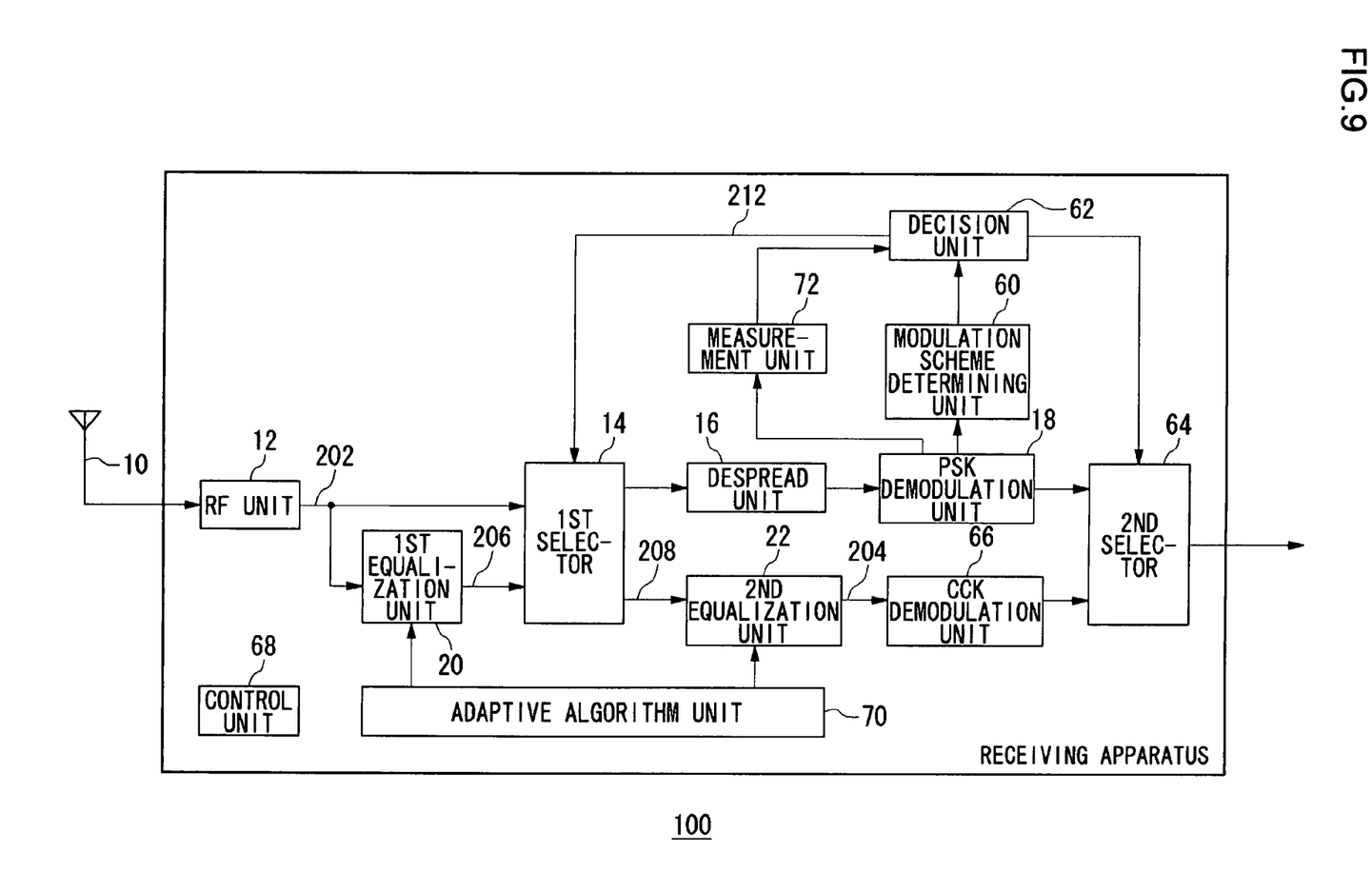
FIG. 9 is a diagram showing a structure of a receiving apparatus according to a second embodiment.

FIG. 9 shows a structure of a receiving apparatus 100 according to the second embodiment of the present invention. Compared with the receiving apparatus 100 as shown in FIG.

1, a measurement unit 72 is added thereto in the second embodiment. The measurement unit 72 measures an error rate of the signals which have been PSK-demodulated in the header of a burst signal or counts the number of errors in a given period of time. Then the measurement unit 72 outputs the measurement result to a decision unit 62. If the modulation scheme determined by a modulation scheme determining unit 60 is PSK and if the error rate or the error count measured in the measurement unit 72 is worse than a predetermined threshold value, the decision unit 62 decides on the operation of a first equalization unit 20. That is, the decision unit 62 inputs a first equalizer output unit 206, outputted from the first equalization unit 20, to an despread unit 16.

Figure 10:
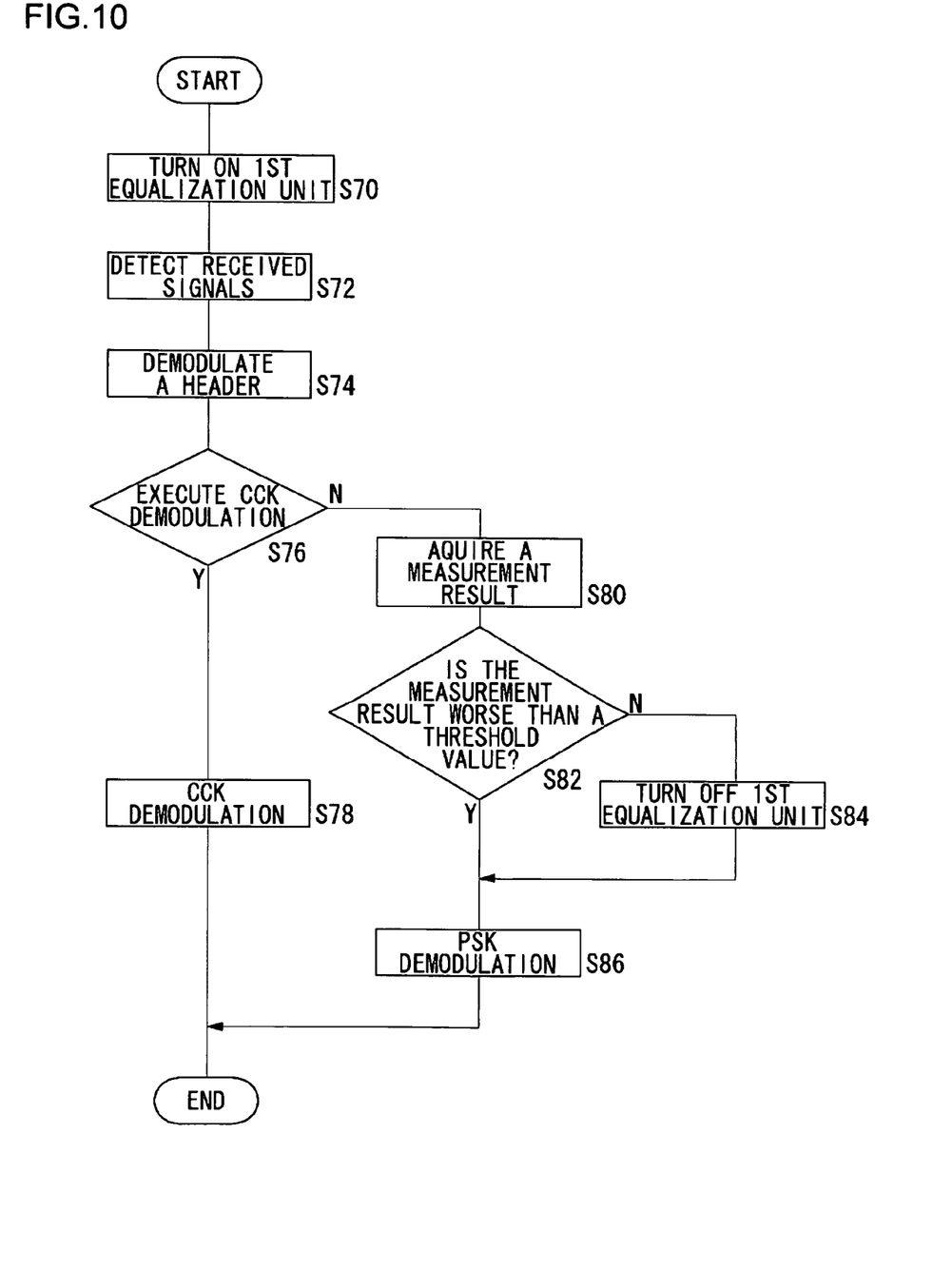
FIG. 10 is a flowchart showing an operation of the receiving apparatus shown in FIG. 9 when it is receiving data.

FIG. 10 is a flowchart showing an operation of the receiving apparatus 100 shown in FIG. 9 when it is receiving data. The receiving apparatus 100 turns on the first equalization unit 20 (S70). As discussed earlier, although the first equalization unit 20 was turned on, the first selector and the second selector 64 are so operated as to select the despread unit 16 and the PSK demodulation unit 18. In other words, turning on the first equalization unit 20 enables the computation of the tap coefficients in the adaptive algorithm unit 70. The receiving apparatus 100 detects received signals (S72). The PSK demodulation unit 18 demodulates the header (S74), and the modulation scheme determining unit 60 acquires from the demodulated header a modulation scheme of the data. As a result thereof, if CCK modulation is to be executed (Y of S76), the CCK demodulation unit 66 carries out CCK demodulation (S78). If, on the other hand, CCK demodulation is not to be executed (N of S76), the decision unit 62 acquires a measurement result from the measurement unit 72 (S80). If the acquired measurement result is worse than a threshold value (Y of S82), the despread unit 16 and the PSK demodulation unit 18 perform PSK demodulation on the first equalizer output signal outputted from the first equalization unit 20 (S86). If the acquired measurement result is not worse than the threshold value (N of S82), the decision unit 62 turns off the first equalization unit 20 (S84). Then the despread unit 16 and the PSK demodulation unit 18 carry out PSK modulation (S86).

According to the second embodiment of the present invention, the operation of an equalizer is stopped in accordance with the modulation scheme of signals. Hence, the power consumption can be reduced whereas the signal transmission quality is being maintained at a predetermined level. Moreover, the equalizer is activated if the quality of signals suffers deterioration even under the modulation scheme whose transmission rate is low. Hence, the worsening of the signal transmission quality can be prevented.

Third Embodiment

Similar to the previous embodiments, a structure according to a third embodiment of the present invention is such that the equalizer is activated in a modulation scheme of a high transmission rate and it is stopped in a modulation scheme of a low transmission rate. Although in the previous embodiments the operation of the equalizer is selected by the use of a switch that switches a signal line, a structure according to this embodiment is such that the switching of signal is achieved by interchanging the tap coefficients in the equalizer.

The receiving apparatus 100 according to the third embodiment relates to that of the type shown in FIG. 1. However, the structures of the first equalization unit 20 and the first selector 14 differ from those shown in FIG. 1 and, though not shown, these functions are integrally formed into an equalization-selection unit 74.

Figure 11:
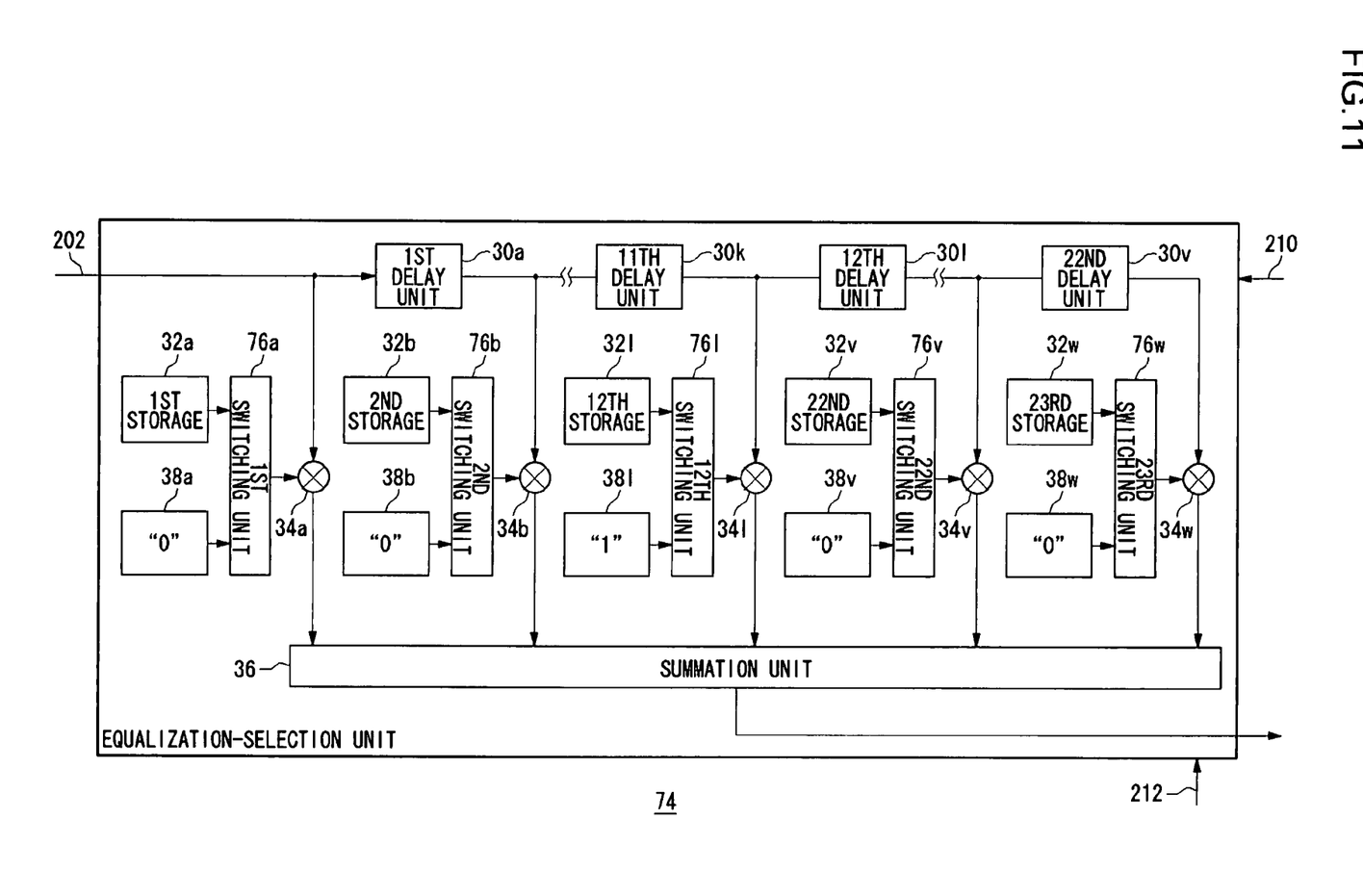
FIG. 11 is a diagram showing a structure of an equalization-selector unit according to a third embodiment.

FIG. 11 shows a structure of the equalization-selection unit 74 according to the third embodiment. In addition to the first equalization unit 20 of FIG. 4, the equalization-selection unit 74 includes a 1st constant storage 38a, a 2nd constant storage 38b, . . . , a 12th constant storage 38l, . . . a 22nd constant storage 38v and a 23rd constant storage 38w, which are generically referred to as "constant storage 38", and a 1st switching unit 76a, a 2nd switching unit 76b, . . . , a 12th switching unit 76l, . . . , a 22nd switching unit 76v and a 23rd switching unit 76w, which are generically referred to as "switching unit 76". The values stored within the constant storages 38 are shown in FIG. 11. For example, since the 1st constant storage 38a holds a complex number of (0, 0), "0" is indicated in FIG. 11 whereas since the 12th constant storage unit 38l stores a complex number of (1, 0), "1" is indicated in FIG. 11.

The switching unit 76 switches the signal to be outputted to the multiplier 34, based on a selection signal 212. That is, when informed by the selection signal 212 that the modulation scheme is the PSK modulation, the switching unit 76 selects an output from the constant storage 38 and then outputs it to the multiplier 34. On the other hand, when informed by the selection signal 212 that the modulation scheme is the CCK modulation, the switching unit 76 selects an output from the storage 32 and outputs it to the multiplier 34.

The multiplier 34 multiplies a signal outputted from the delay unit 30 and a digital signal 202 by the signal outputted from the switching unit 76. Here, if the output from the constant storage 38 is selected by the switching unit 76, the multiplication result at the 12th multiplier 34l only has a predetermined value and the other multiplication results are all "0". This is equivalent to a state that the equalization processing is not executed and the digital signal 202 is delayed so as to be outputted. On the other hand, if the output from the storage 32 is selected by the switching unit 76, the equalization processing is carried out as in the above first and second embodiments.

If the modulation scheme is the PSK modulation, the output from the summation unit 36 will be outputted to the despread unit 16. If the modulation scheme is the CCK modulation, it will be outputted to the second equalization unit 22.

According to the present embodiment, the operation is done under the same timing in the either case where the equalization processing is executed or not executed, so that the circuit can be designed under a single timing. Since the circuit design can be made under the single timing, the operation can be stabilized.

The present invention has been described based on the embodiments. The embodiments are only exemplary and it is therefore understood by those skilled in the art that other various modifications to the combination of each component and process are possible and that such modifications are also within the scope of the present invention.

In the first to the third embodiment of the present invention, the receiving apparatus 100 is used for the wireless LAN compatible with the IEEE 802.11b standard. However, the present invention is not limited thereto and, for example, the receiving apparatus 100 may be used for a mobile-phone system, particularly the third-generation portable telephone system, or the wireless LAN compatible with the IEEE 802.11a standard and the like other than the IEEE 802.11b. According to this modification, the present invention can be applied to various types of wireless systems. That is, it is only necessary that the wireless system is compatible with a plurality of modulation systems.

In the first to the third embodiment of the present invention, a linear filter is used as the first equalization unit 20. However, the equalizer is not limited thereto and, for example, MLSE (Maximum Likelihood Sequence Estimation) or the like may be used. According to this modification, various types of equalizers may be applied as the first equalization unit 20. That is, the type of an equalizer used as the first equalization unit 20 may be chosen arbitrarily depending on the characteristics of a radio channel in question.

In the second embodiment of the present invention, the measurement unit 72 measures the error rate or counts the number of errors in the header of a burst signal. However, the arrangement is not limited thereto and, for example, the error rate or the error count may be measured in the data of a burst signal. In such a case, the measurement result will be reflected in a burst signal received next time. According to this modification, the measurement accuracy is improved. That is, it suffices if the quality of signals can be determined under the PSK modulation. Moreover, the determination may done based on an S/N ratio measured.

Arbitrary combination among the first to the third embodiment of the present invention is also effective. According to this modification, the effects combining these are obtained.

INDUSTRIAL APPLICABILITY

The power consumption can be reduced by changing a circuit to be operated in accordance with a modulation scheme used for the transmission of signals.

The invention claimed is:

1. A receiving apparatus, comprising:
a receiver which receives a signal;
an equalization processing unit which performs equalization processing on the signal received by said receiver;
a selector which selects either the signal received by said receiver or the signal on which the equalization processing has been performed by said equalization processing unit;
a first demodulation unit which demodulates the selected signal according to a first modulation scheme when a modulation scheme of the selected signal is the first modulation scheme; and
a second demodulation unit which demodulates the selected signal according to a second modulation scheme when a modulation scheme of the selected signal is the second modulation scheme whose transmission rate is higher than that of the first modulation scheme,
wherein said equalization processing unit comprises:
a plurality of delay units that store the received signals successively;
a constant storage that stores a plurality of constants that are to be multiplied by the respective signals stored in the plurality of delay units and that are zeros except for ones;
a storage that stores a plurality of coefficients that are to be multiplied by the respective signals stored in the plurality of delays units and that are used for adaptive equalization;
a plurality of multipliers that multiply the constants stored in the constant storage or the plurality of coefficients stored in the storage by the signals stored in the plurality of delay units, associating the constants or the coefficients with the signals; and
a summation unit that sums up multiplication results in the plurality of multipliers, and
wherein if the modulation scheme of the received signal is the first modulation scheme, said selector outputs the plurality of constants stored in the constant storage to the plurality of multipliers to select the signal received by said receiver, and if the modulation scheme of the received signal is the second modulation scheme, said selector outputs the plurality of coefficients stored in the storage to the plurality of multipliers to select the signal on which the equalization processing has been performed.

2. A receiving apparatus according to claim 1, wherein when said selector selects the signal received by said receiver, said equalization processing unit stops the equalization processing.

3. A receiving apparatus according to claim 1, wherein a signal to be received by said receiver is a burst signal and the modulation scheme for a header portion of the burst signal is the first modulation scheme, and
wherein said equalization processing unit performs equalization processing on at least part of the header portion of the burst signal, and stops performing the equalization processing on the remaining portion of the burst signal when said selector has selected the signal received by said receiver.

4. A receiving apparatus according to claim 1, further comprising a measurement unit which measures the quality of the signal received by said receiver when the modulation scheme of the signal received by said receiver is the first modulation signal,
wherein when the measured quality of the signal is worse than a predetermined threshold value, said selector selects the signal on which the equalization processing has been performed by said equalization processing unit although the modulation scheme of the received signal is the first modulation scheme.

5. A receiving apparatus according to claim 1, wherein said second demodulation unit further includes a residual component processing unit which further performs equalization processing on the selected signal.

* * * * *